(12) United States Patent
Ito

(10) Patent No.: US 9,543,791 B2
(45) Date of Patent: Jan. 10, 2017

(54) POWER TRANSMISSION APPARATUS, POWER TRANSMISSION METHOD, AND STORAGE MEDIUM

(71) Applicant: CANON KABUSHIKI KAISHA, Tokyo (JP)

(72) Inventor: Akio Ito, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 473 days.

(21) Appl. No.: 14/218,139

(22) Filed: Mar. 18, 2014

(65) Prior Publication Data

US 2014/0285004 A1    Sep. 25, 2014

(30) Foreign Application Priority Data

Mar. 21, 2013 (JP) .................. 2013-058361

(51) Int. Cl.
*H02J 17/00* (2006.01)
*H02J 5/00* (2016.01)
*H02J 7/02* (2016.01)
*H02J 7/00* (2006.01)

(52) U.S. Cl.
CPC ................ *H02J 17/00* (2013.01); *H02J 5/005* (2013.01); *H02J 7/025* (2013.01); *H02J 2007/0096* (2013.01); *Y10T 307/25* (2015.04)

(58) Field of Classification Search
CPC ........................................ H02J 5/005
USPC ........................................ 307/104
See application file for complete search history.

(56) References Cited

FOREIGN PATENT DOCUMENTS

JP    11-341017 A    12/1999
JP    2005-286878 A    10/2005

*Primary Examiner* — Robert Deberadinis
(74) *Attorney, Agent, or Firm* — Canon USA, Inc. IP Division

(57) ABSTRACT

A waiting time during which receiving of a power receiving request is accepted from a power transmission apparatus is appropriately managed, to shorten a time required until power transmission is completed.

20 Claims, 14 Drawing Sheets

FIG.12

| RESPONSE NUMBER | RESPONSE WAITING TIME |
|---|---|
| 0 | EXTEND $t1 + t2$ |
| 1 | |
| 2 | |
| 3 | |
| 4 | NO CHANGE $t1$ |
| 5 | |
| 6 | |
| 7 | |
| 8 | END $t1$ OR LESS |
| 9 | |
| 10 | |
| .... | |

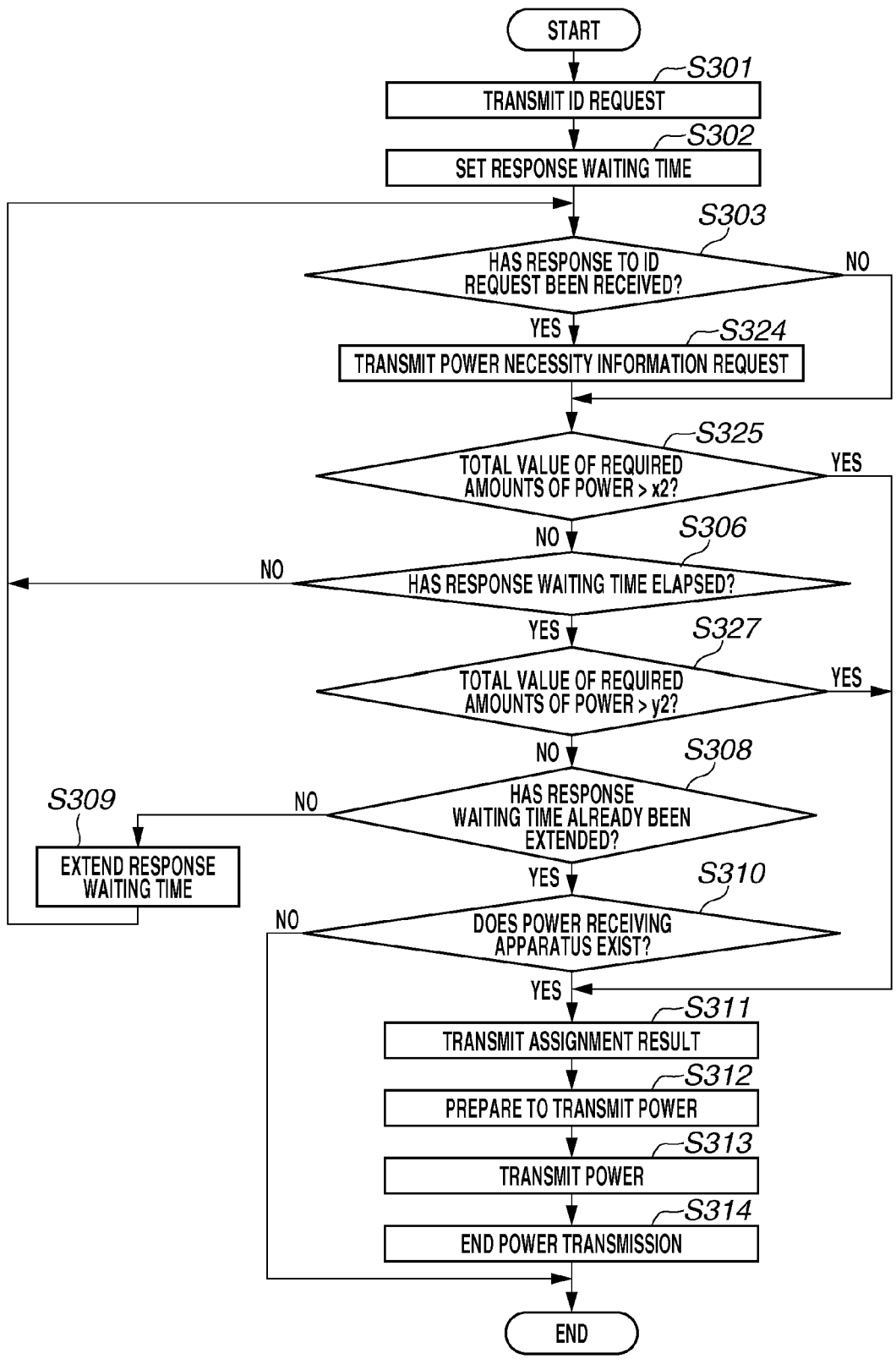

FIG.14

| DETECT | REQUIRED AMOUNT OF POWER (mW/min) | DETERMINATION CRITERION (mW/min) | RESPONSE WAITING TIME |
|---|---|---|---|
| POWER RECEIVING APPARATUS (1) | 100 | 500 mW OR LESS | EXTEND t1 + t2 |
| POWER RECEIVING APPARATUS (2) | 200 | | |
| POWER RECEIVING APPARATUS (3) | 100 | | |
| POWER RECEIVING APPARATUS (4) | 200 | MORE THAN 500 mW AND 1000 mW OR LESS | NO CHANGE t1 |
| POWER RECEIVING APPARATUS (5) | 100 | | |
| POWER RECEIVING APPARATUS (6) | 200 | | |
| POWER RECEIVING APPARATUS (7) | 300 | MORE THAN 1000 mW | END t1 OR LESS |

POWER TRANSMISSION APPARATUS, POWER TRANSMISSION METHOD, AND STORAGE MEDIUM

BACKGROUND OF THE INVENTION

Field of the Invention

The present invention relates to a power transmission apparatus, a power transmission method, and a storage medium.

Description of the Related Art

Conventionally, a technique for supplying power in non-contact manner (wirelessly) has been known. There are four systems for supplying power in non-contact manner, i.e., an electromagnetic induction system, a magnetic field resonance system, an electric field coupling system, and an electric wave receiving system. The magnetic field resonance system is characterized by sufficient power to be transmitted and a long power transmission distance. Thus, the magnetic field resonance system has been particularly paid attention to out of the four systems. In the magnetic field resonance system, a 1-to-N power supply system in which a power transmission apparatus transmits power to a plurality of wireless power receiving apparatuses with use of the long power transmission distance has been proposed.

In a 1-to-N communication system, a technique for detecting a plurality of apparatuses on a network has been known. Japanese Patent Application Laid-Open No. 2005-286878, for example, discusses a wide area monitoring control system in which a master station device, which collects data by poling, and a plurality of slave station devices, which operates as a relay station, are connected to each other via a wireless network. In this system, the master station device changes a communication path pattern if it cannot receive data from the slave station devices within a data receiving waiting time, to receive data from the slave station devices.

Japanese Patent Application Laid-Open No. 11-341017 discusses a technique for a master station collecting data from a plurality of slave stations connected to a bus-shaped network. In this technique, a timeout value is set for each of the slave stations, and a master station determines whether data can be collected until it reaches the timeout value set for each of the slave stations.

Conventionally, in a system for supplying power in non-contact manner, a power transmission apparatus accepts receiving of a power receiving request from a power receiving apparatus during a predetermined waiting time, to transmit power to the power receiving apparatus from which it has received the power receiving request. If the waiting time becomes too long, however, a power transmission processing time required until the power transmission is completed becomes longer.

SUMMARY OF THE INVENTION

According to an aspect of the present invention, an apparatus includes a transmission unit configured to transmit inquiry information for inquiring presence or absence of a power receiving request to a plurality of power receiving apparatuses, a receiving unit configured to receive response information to the inquiry information from each of the power receiving apparatuses, a determination unit configured to determine an end timing at which a response waiting time during which the receiving unit waits for the receiving of the response information based on a receiving situation of the response information within a first time from a transmission timing at which the inquiry information has been transmitted, and a transmission unit configured to transmit power after a lapse of the end timing.

Further features of the present invention will become apparent from the following description of exemplary embodiments with reference to the attached drawings.

BRIEF DESCRIPTION OF THE DRAWINGS

FIG. 12 illustrates a response waiting time.
FIG. 13 is a flowchart illustrating power transmission processing.
FIG. 14 illustrates a response waiting time.

DESCRIPTION OF THE EMBODIMENTS

Various exemplary embodiments, features, and aspects of the invention will be described in detail below with reference to the drawings.

Figure 1:
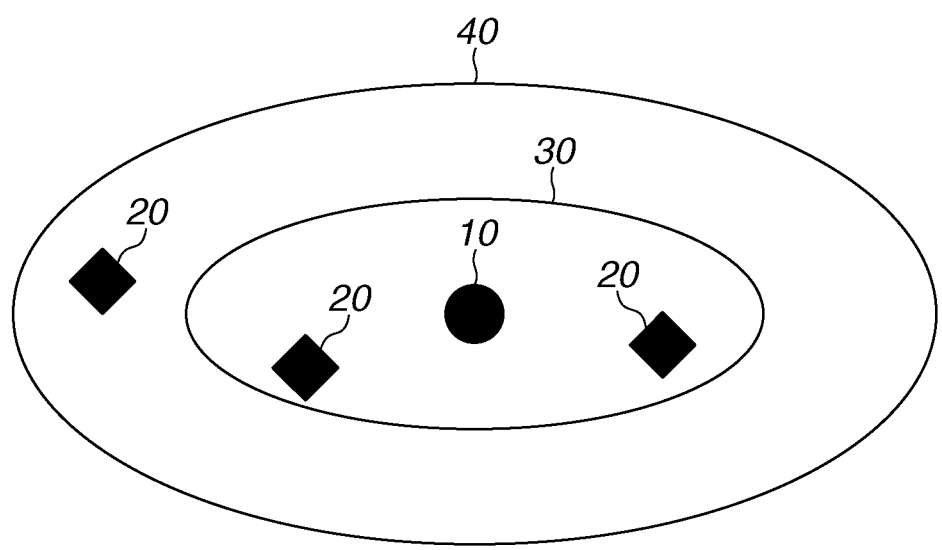
FIG. 1 illustrates a wireless power supply system.

FIG. 1 illustrates a wireless power supply system according to a first exemplary embodiment. The wireless power supply system performs power supply using a magnetic field resonance system, for example. The wireless power supply system includes a power transmission apparatus 10 and a plurality of power receiving apparatuses 20. While only one power transmission apparatus 10 is illustrated in FIG. 1, the wireless power supply system includes a plurality of power transmission apparatuses 10. The power transmission apparatus 10 wirelessly supplies power to the power receiving apparatus 20. The power transmission apparatus 10 performs data communication required to supply power to the power receiving apparatus 20. The power receiving apparatus 20 is wirelessly supplied with power from the power transmission apparatus 10. The power receiving apparatus 20 performs data communication required to supply power with the power transmission apparatus 10.

A power supply area 30 illustrated in FIG. 1 is an area where power can be supplied from the power transmission apparatus 10 to the power receiving apparatus 20. A communication area 40 is an area where data communication can be performed between the power transmission apparatus 10 and the power receiving apparatus 20. The power supply area 30 is wider than the communication area 40. Specifically, the power supply area 30 is included in the communication area 40. If the plurality of power receiving apparatuses 20 exists in the power supply area 30, as illustrated in FIG. 1, the power transmission apparatus 10 can wirelessly supply power to the plurality of power receiving apparatuses 20 in parallel.

Figure 2:
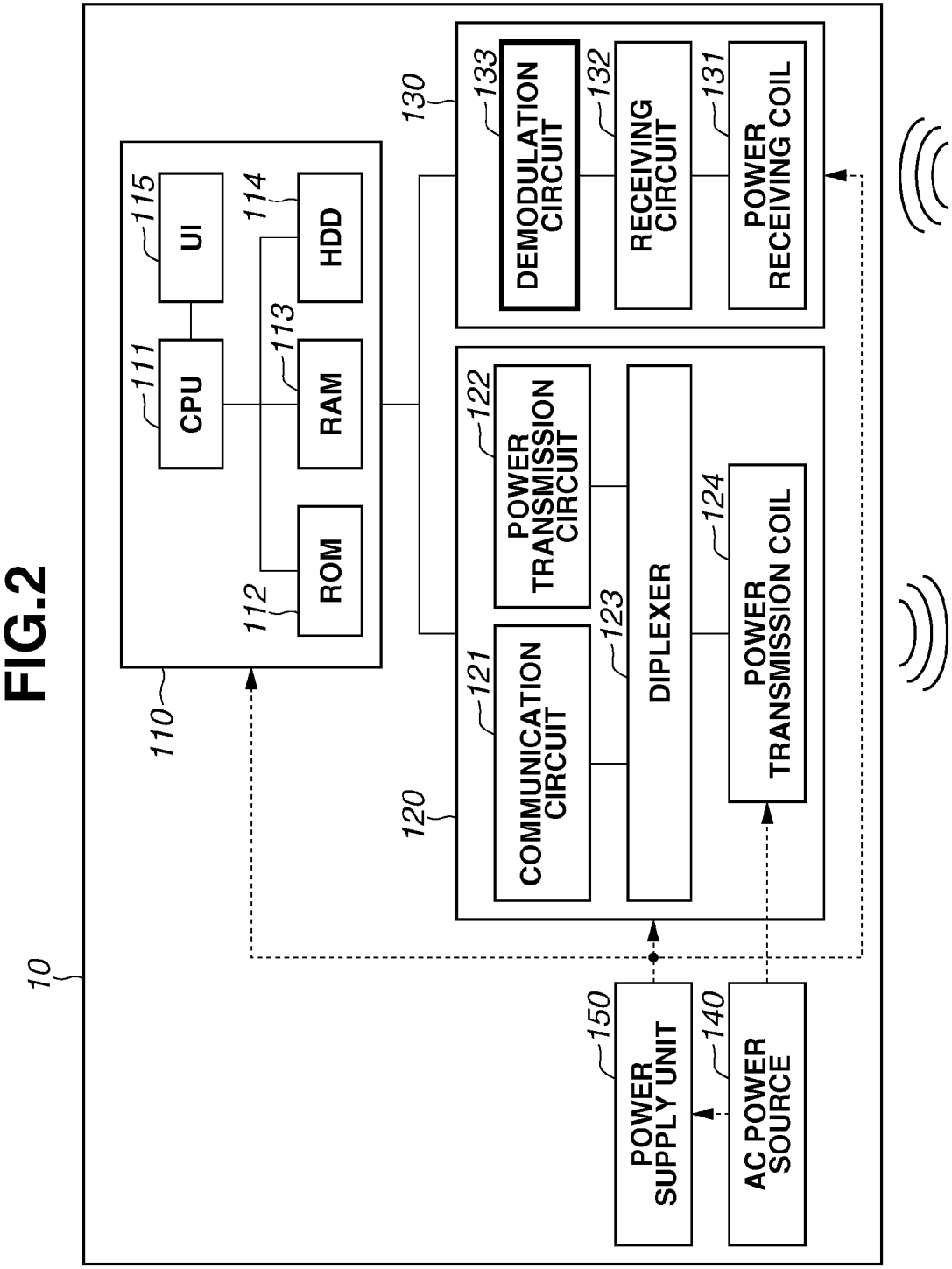
FIG. 2 illustrates a power transmission apparatus.

FIG. 2 illustrates the power transmission apparatus 10. In FIG. 2, a line representing exchange of data is indicated by a solid line, and a line representing supply of power is indicated by a dotted line. The power transmission apparatus 10 includes a control unit 110, a wireless transmission unit 120, a wireless receiving unit 130, an alternating current (AC) power source 140, and a power supply unit 150.

The control unit 110 controls the power transmission apparatus 10. The control unit 110 includes a central processing unit (CPU) 111, a read-only memory (ROM) 112, a random access memory (RAM) 113, a hard disk (HDD) 114, and a user interface (UI) 115. The control unit 110 is connected to the wireless transmission unit 120 and the wireless receiving unit 130 via an internal bus.

The CPU 111 processes various types of data, and controls the power transmission apparatus 10. The ROM 112 is a nonvolatile storage medium, and stores a boot program used by the CPU 111. The RAM 113 is a volatile storage medium, and temporarily stores data and a program used by the CPU 111. The HDD 114 is a nonvolatile storage medium, and stores an operating system (OS) and an application used by the CPU 111. The UI 115 displays various types of information to a user, and receives various types of instructions from the user.

The wireless transmission unit 120 wirelessly transmits power to the power receiving apparatus 20. The wireless transmission unit 120 includes a communication circuit 121, a power transmission circuit 122, a diplexer 123, and a power transmission coil 124. The communication circuit 121 generates a modulation signal for performing communication. The power transmission circuit 122 generates a modulation signal for transmitting power.

The diplexer 123 combines the modulation signal generated by the communication circuit 121 and the modulation signal generated by the power transmission circuit 122. The power transmission coil 124 transmits the modulation signals, which have been combined by the diplexer 123, to the power receiving apparatus 20.

The wireless receiving unit 130 receives data from the power receiving apparatus 20. The wireless receiving unit 130 includes a power receiving coil 131, a receiving circuit 132, and a demodulation circuit 133.

The power receiving coil 131 receives a modulation signal for performing communication from the power receiving apparatus 20. The receiving circuit 132 receives the modulation signal received by the power receiving coil 131. The demodulation circuit 133 demodulates the modulation signal received by the receiving circuit 132.

The AC power source 140 supplies an AC voltage to the power transmission coil 124 and the power supply unit 150. The power supply unit 150 converts the AC voltage supplied by the AC power source 140 into a direct current (DC) voltage, and supplies the DC voltage to the control unit 110, the wireless transmission unit 120, and the wireless receiving unit 130.

Functions and processes of the power transmission apparatus 10, described below, are implemented when the CPU 111 reads out a program stored in the ROM 112 or the HDD 114 and executes the program.

Figure 3:
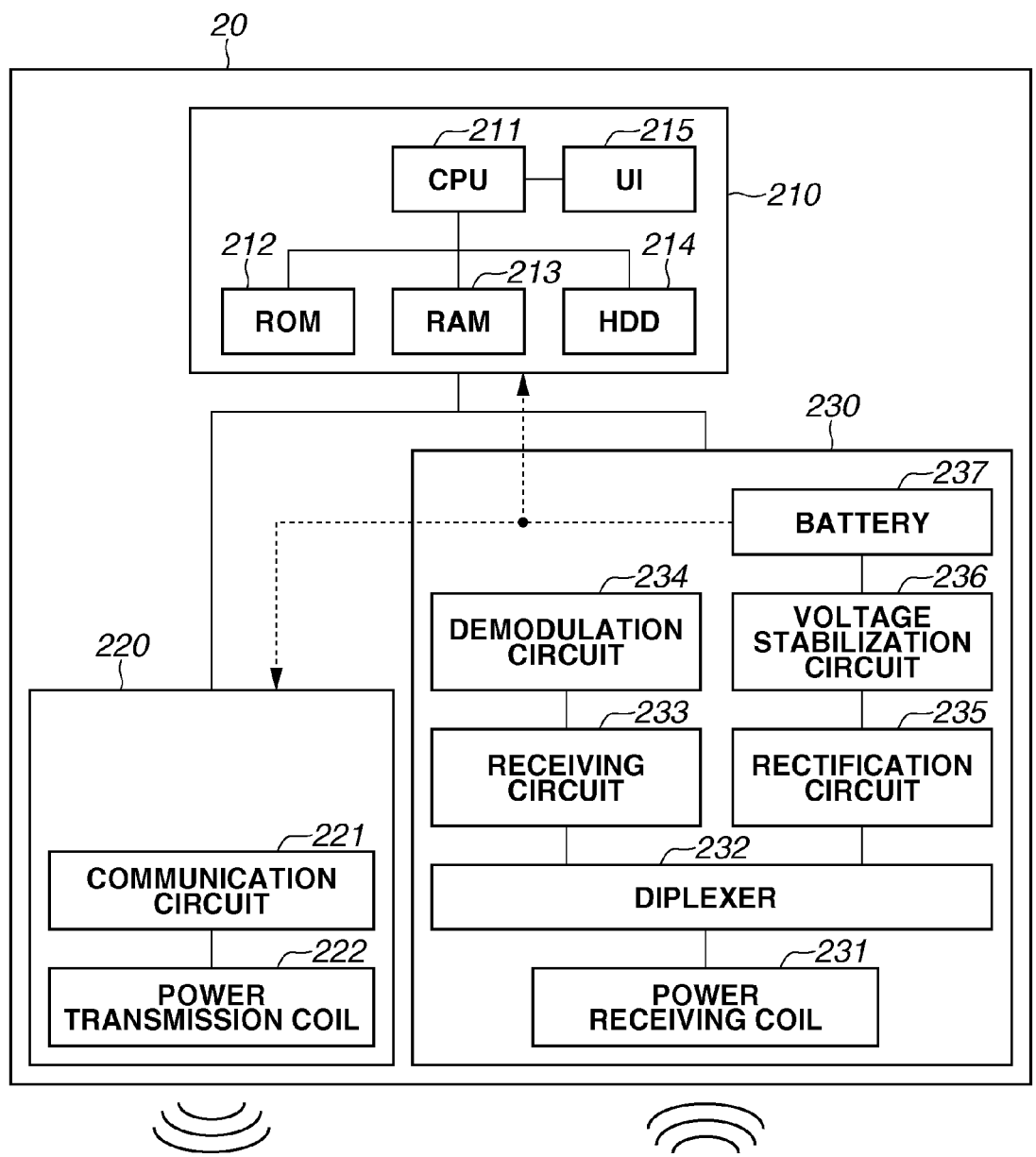
FIG. 3 illustrates a power receiving apparatus.

FIG. 3 illustrates the power receiving apparatus 20. In FIG. 3, a line representing exchange of data is indicated by a solid line, and a line representing supply of power is indicated by a dotted line. The power receiving apparatus 20 includes a control unit 210, a wireless transmission unit 220, and a wireless receiving unit 230. The control unit 210 controls the power receiving apparatus 20. The control unit 210 includes a CPU 211, a ROM 212, a RAM 213, an HDD 214, and a UI 215. The control unit 210 is connected to the wireless transmission unit 220 and the wireless receiving unit 230 via an internal bus.

The CPU 211 processes various types of data, and controls the power receiving apparatus 20. The ROM 212 is a nonvolatile storage medium, and stores a boot program used by the CPU 211. The RAM 213 is a volatile storage medium, and temporarily stores data and a program used by the CPU 211. The HDD 214 is a nonvolatile storage medium, and stores an OS and an application used by the CPU 111. The UI 215 displays various types of information to the user, and receives various types of instructions from the user.

The wireless transmission unit 220 transmits data to the power transmission apparatus 10. The wireless transmission unit 220 includes a communication circuit 221 and a power transmission coil 222. The communication circuit 221 generates a modulation signal for performing communication. The power transmission coil 222 transmits the modulation signal generated by the communication circuit 221 to the power transmission apparatus 10.

The wireless receiving unit 230 wirelessly receives power from the power transmission apparatus 10. The wireless receiving unit 230 includes a power receiving coil 231, a diplexer 232, a receiving circuit 233, a demodulation circuit 234, a rectification circuit 235, a voltage stabilization circuit 236, and a battery 237. The power receiving coil 231 receives a modulation signal from the power transmission apparatus 10. The diplexer 232 divides the modulation signal received by the power receiving coil 231 into a modulation signal for performing communication and a modulation signal for transmitting power. The receiving circuit 233 receives the modulation signal for performing communication obtained by the division by the diplexer 232.

The demodulation circuit 234 demodulates the modulation signal received by the receiving circuit 233. The rectification circuit 235 rectifies the modulation signal for transmitting power obtained by the division by the diplexer 232, to generate a DC voltage. The voltage stabilization circuit 236 stabilizes the DC voltage generated by the rectification circuit 235. The battery 237 receives the DC voltage stabilized by the voltage stabilization circuit 236, to store power. The battery 237 supplies the DC voltage to the control unit 210, the wireless transmission unit 220, and the wireless receiving unit 230 based on the stored power.

Functions and processes of the power receiving apparatus 20, described below, are implemented when the CPU 211 reads out a program stored in the ROM 212 or the HDD 214 and executes the program.

Figure 4:
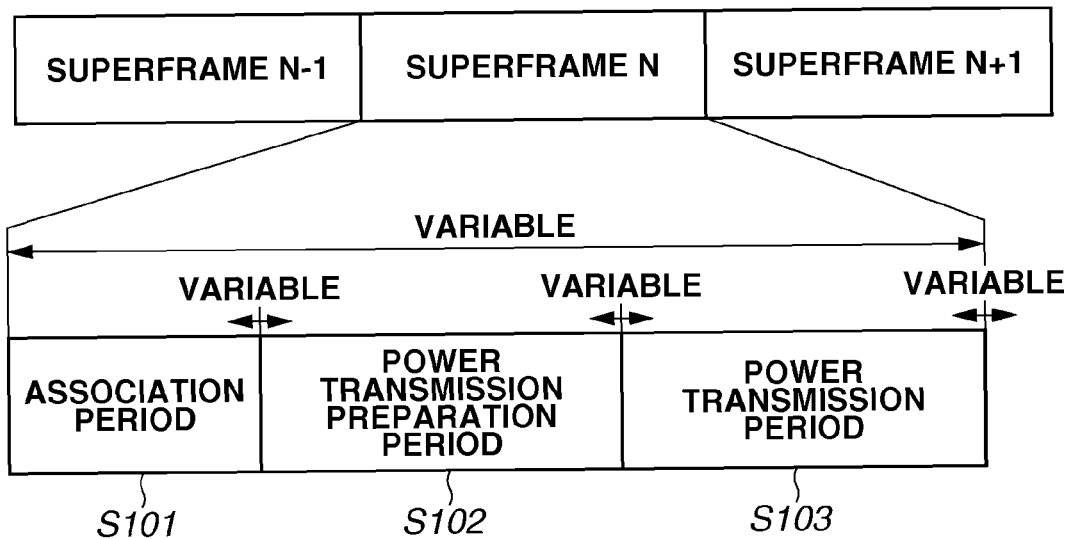
FIG. 4 illustrates an example of a superframe.

FIG. 4 illustrates an example of a superframe. The wireless power supply system according to the present exemplary embodiment performs wireless power supply processing by repeating such a superframe. One superframe includes an association period S101, a power transmission preparation period S102, and a power transmission period S103. Each of the periods is variable.

In the association period S101, the power transmission apparatus 10 confirms a device identifier (ID) and the necessity of power for the power receiving apparatus 20. If the power transmission apparatus 10 receives the device ID and the necessity of power from the power receiving apparatus 20, the association period S101 is shifted to the power transmission preparation period S102. A period during which the association period S101 is shifted to the power transmission preparation period S102 is also variable.

In the power transmission preparation period S102, the power receiving apparatus 20 can transmit a response and an acknowledgement (ACK) of a frame in response to a data request from the power transmission apparatus 10. The length of a response frame and the length of an acknowledgement frame are variable. When the power transmission preparation period S102 ends, the power transmission preparation period S102 is shifted to the power transmission period S103. A period during which the power transmission preparation period S102 is shifted to the power transmission period S103 is also variable.

In the power transmission period S103, the power transmission apparatus 10 transmits power to the power receiving apparatus 20. In the power transmission period S103, the power receiving apparatus 20 can transmit the frame to the power transmission apparatus 10 even if there is no request frame from the power transmission apparatus 10.

Figure 5:
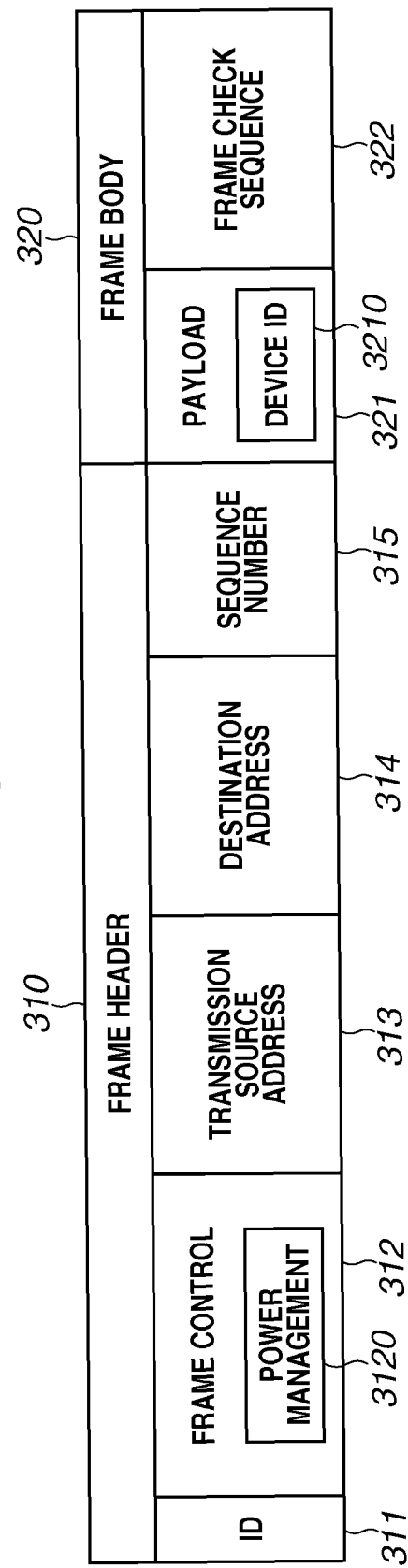
FIG. 5 illustrates an example of a frame format.
Figure 6:
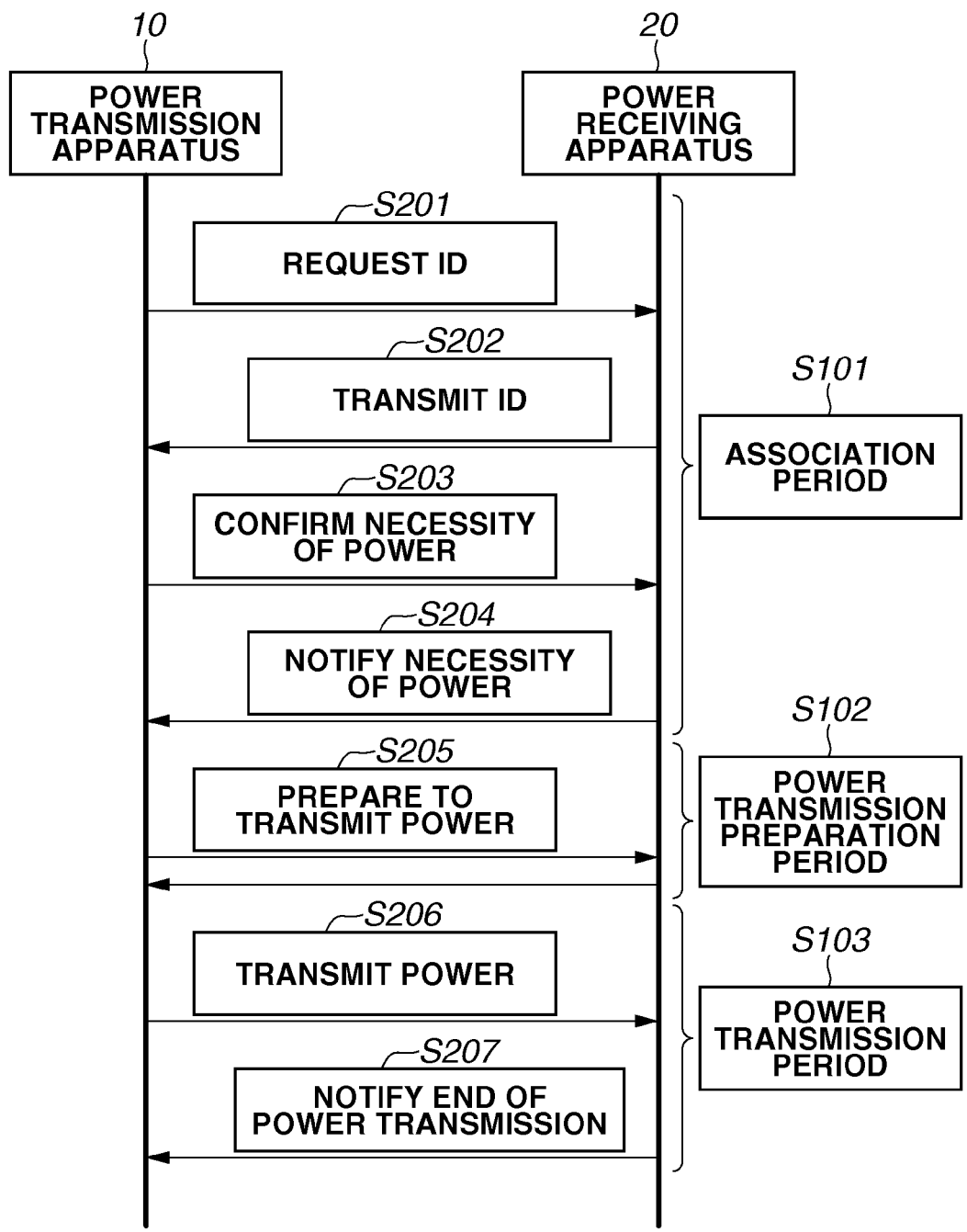
FIG. 6 is a sequence diagram illustrating data transmission and receiving processing.

FIG. 5 illustrates an example of a frame format. In the superframe, described above, data communication using a packet in the frame format, as illustrated in FIG. 6, is implemented. Through the data communication, transmission and receiving of data required to start to wirelessly supply power are performed.

A frame header 310 represents a destination for data transfer. The frame header 310 includes an ID 311, a frame control 312, a transmission source address 313, a destination address 314, and a sequence number 315. The ID 311 is used when data communication is performed in the wireless power supply system.

The frame control 312 is information for exchanging data in the power receiving apparatus 20. The frame control 312 includes a power management 3120. The power management 3120 is data for confirming the necessity of power. The transmission source address 313 is an address as a transmission source during data transfer. The destination address 314 is an address at a destination during data transfer. The sequence number 315 is a frame number.

A frame body 320 is information about a data body when data is transferred. The frame body 320 includes a payload 321 and a frame check sequence 322. The payload 321 is the data body. The payload 321 is assigned a device ID 3210, for example. The frame check sequence 322 is data for checking the payload 321 for an error.

FIG. 6 is a sequence diagram illustrating data transmission and receiving processing between the power transmission apparatus 10 and the power receiving apparatus 20 in the superframe. In step S201, the power transmission apparatus 10 transmits an ID request (ARQ signal) for requesting the device ID 3210 to the power receiving apparatus 20. At this time, the power transmission apparatus 10 uses the ID 311 in the frame format.

In step S202, the power transmission apparatus 10 receives response information (ARS signal) including the device ID 3210 from the power receiving apparatus 20. In step S203, the power transmission apparatus 10 then confirms the necessity of power for the power receiving apparatus 20. Specifically, the power transmission apparatus 10 embeds information for requesting the presence or absence of the necessity of power in the power management 3120 in the frame format, to generate a power necessity information request. The power transmission apparatus 10 transmits the generated power necessity information request as a request frame.

In step S204, the power receiving apparatus 20 then notifies, if it requires power, the power transmission apparatus 10 that power is required. Specifically, the power receiving apparatus 20 embeds a power receiving request indicating that power receiving is requested because power is required in the power management 3120 in the frame format, to generate power necessity information. The power receiving apparatus 20 transmits the generated power necessity information as a response frame to the power transmission apparatus 10. The power receiving apparatus 20 embeds, if it does not require power, information indicating that no power is required in the power management 3120 or leaves the power management 3120 blank, to generate power necessity information.

In step S204, the power receiving apparatus 20 notifies, if it does not require power, the power transmission apparatus 10 that no power is required. Specifically, the power receiving apparatus 20 generates power necessity information indicating that no power is required using the power management 3120 in the frame format, and transmits the generated power necessity information as a response frame to the power transmission apparatus 10. The power transmission apparatus 10 determines the power receiving apparatus 20 serving as a power transmission target based on a response result of the necessity of receiving power (power necessity information).

In step S205, the power transmission apparatus 10 then prepares to transmit power. In step S206, the power transmission apparatus 10 then transmits power to the power receiving apparatus 20. In step S207, the power receiving apparatus 20 then transmits a power transmission end notification to the power transmission apparatus 10 when the battery 237 is fully charged. At this time, the power management 3120 in the frame format is used. This is the end of one superframe. Thus, data communication for wirelessly supplying power is implemented by performing data transmission and receiving processing in the superframe between the power transmission apparatus 10 and the power receiving apparatus 20.

The power transmission apparatus 10 repeats the superframe, to repeat the association period S101, the power transmission preparation period S102, and the power transmission period S103 in the superframe. Thus, reducing a time taken for the association period S101 and the power transmission preparation period S102 other than the power transmission period S103 required to transmit power is effective to improve the efficiency of the entire power transmission processing by the power transmission apparatus 10. Particularly, optimizing the association period S101 greatly contributes to an improvement in the efficiency of the power transmission by the power transmission apparatus 10.

Figure 7:
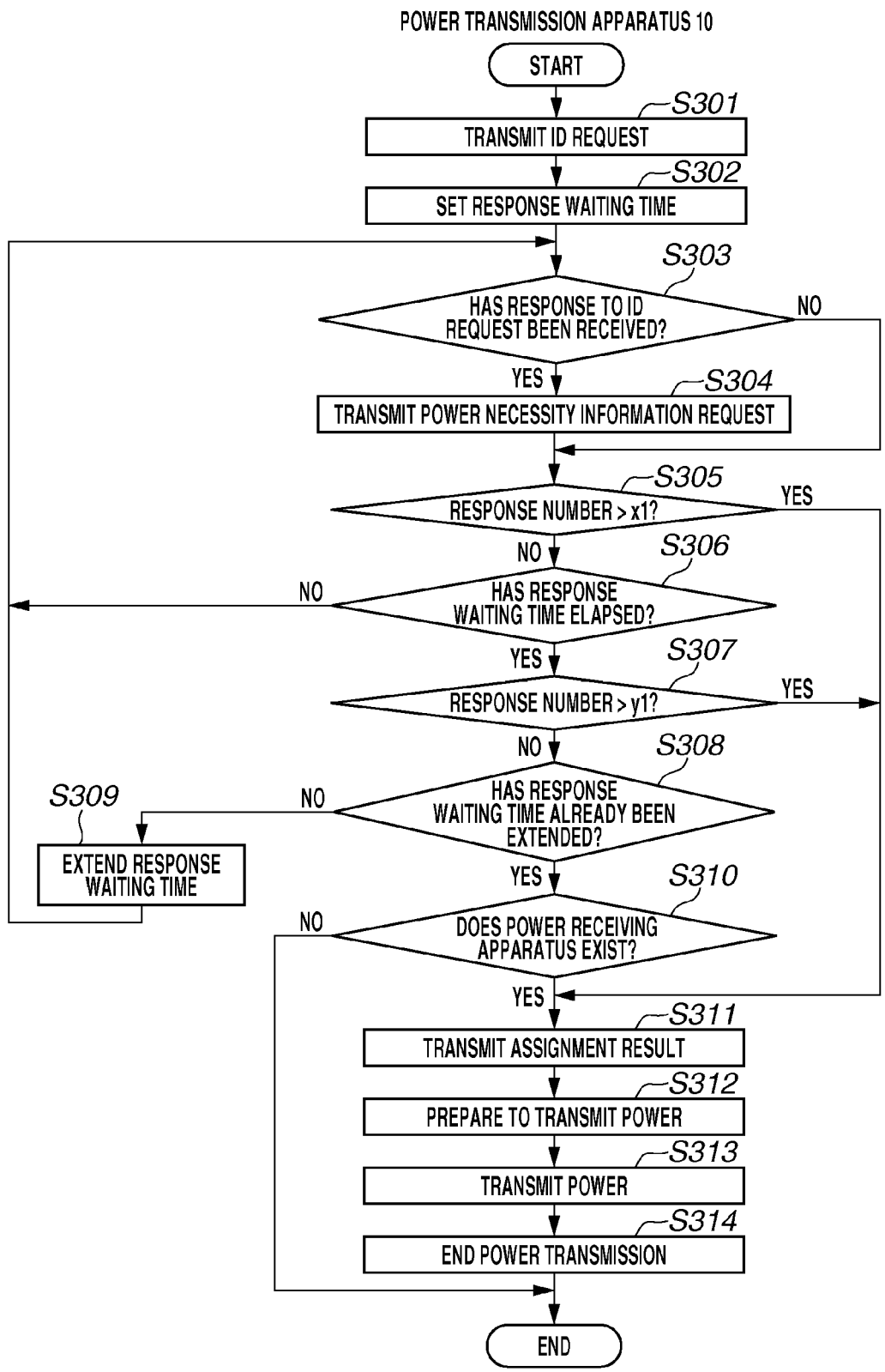
FIG. 7 is a flowchart illustrating power transmission processing.

Detailed processing in the association period S101 will be described below. FIG. 7 is a flowchart illustrating power transmission processing in one transmission channel of the power transmission apparatus 10. Processes in steps S301 to S310 illustrated in FIG. 7 correspond to the processes in steps S201 to S204 in the data transmission and receiving processing (FIG. 6). Processes in steps S311 to S314 illustrated in FIG. 7 correspond to the processes in steps S205 to S207 in the processing in the superframe.

In step S301, the CPU 111 in the power transmission apparatus 10 transmits a device ID request from the wireless transmission unit 120.

In step S302, the CPU 111 then sets a response waiting time (t1) from the power receiving apparatus 20. The response waiting time (t1) is an example of a first time. The response waiting time (t1), which is set in step S302, is a previously set value, and is stored in the ROM 112 or the HDD 114, for example. In step S302, the CPU 111 further starts to measure an elapsed time from a transmission timing at which the device ID request has been transmitted using a time counter provided therein.

In step S303, the CPU 111 then waits for a response from the power receiving apparatus 20 to the device ID request that has been transmitted in step S301, and determines whether the response has been received. If the response from the power receiving apparatus 20 has been received (YES in step S303), the processing proceeds to step S304. If the response has not been received (NO in step S303), the processing proceeds to step S305.

In step S304, the CPU 111 transmits a power necessity information request from the wireless transmission unit 120 to the power receiving apparatus 20 as a transmission source of the response. The power necessity information request is an example of inquiry information for inquiring the presence or absence of a power receiving request to the power receiving apparatus 20. Step S301 is an example of transmission processing.

While a timing at which the elapsed time to be counted by the CPU 111 is started is the transmission timing at which the device ID request has been transmitted in step S302 in the present exemplary embodiment, it may be a power transmission timing at which the power necessity information request has been transmitted in step S304 as another example.

The power receiving apparatus 20 transmits the power necessity information as a response frame to the power transmission apparatus 10 when it receives the power necessity information request. The power necessity information includes a power receiving request and information about the presence or absence of the battery 237. The power receiving request is an example of information about a response to the inquiry information.

The CPU 111 receives the power necessity information as a response frame via the wireless receiving unit 130 (receiving processing). The CPU 111 stores the received power necessity information as power receiving apparatus information in the RAM 113 in association with the device ID 3210. The CPU 111 performs the process in step S304 every time it receives the power receiving request from the power receiving apparatus 20.

In step S305, the CPU 111 then counts a response number which is the number of power receiving apparatuses 20 as transmission sources of the received power necessity information. Specifically, the CPU 111 reads out the power receiving apparatus information stored in the RAM 113, refers to the read power receiving apparatus information, and counts the number of power receiving apparatuses 20, which have transmitted the power receiving request, as the response number (number counting processing). The response number is an example of a receiving situation. The CPU 111 compares the response number with a first number threshold value x1, and determines whether the response number is larger than the first number threshold value x1. The first number threshold value is a previously set value, and is stored in the ROM 112 or the like. In the present exemplary embodiment, the first number threshold value x1 is set to seven.

If the response number is larger than the first number threshold value (x1=7) (YES in step S305), the CPU 111 determines a timing at which the response number exceeds seven as an end timing (end timing determination processing). The end timing is a timing at which a response waiting time ends. The CPU 111 ends a response waiting state of response information, and the processing proceeds to step S311. More specifically, the CPU 111 ends the response waiting state before a lapse of the response waiting time. In step S311, the CPU 111 ends processing in the association period S101, and shifts the processing to the power transmission preparation period S102.

After shifting to the power transmission preparation period S102, the CPU 111 does not receive the device ID 3210. As another example, the CPU 111 may not handle the device ID 3210 as a power transmission target, although it receives the device ID 3210.

On the other hand, if the response number is the first number threshold value (x1=7) or smaller (NO in step S305), the processing proceeds to step S306, and the CPU 111 continues the processing in the association period S101. In step S306, the CPU 111 reads out the elapsed time from the time counter provided therein, and confirms whether the set response waiting time has elapsed. The CPU 111 repeatedly performs the processes in steps S303 to S305 until the response waiting time elapses. If the response waiting time has elapsed (YES in step S306), the processing proceeds to step S307.

In step S307, the CPU 111 counts the response number, like in the process in step S305. The CPU 111 compares the response number with a second number threshold value y1, and determines whether the response number is larger than the second number threshold value y1. The second number threshold value y1 is a value less than the first number threshold value x1, and is a previously set value. The second number threshold value y1 is stored in the ROM 112 or the like. In the present exemplary embodiment, the second number threshold value y1 is set to three.

If the response number is larger than the second number threshold value (y1=3) (YES in step S307), the processing proceeds to step S311. More specifically, in step S307, the CPU 111 determines a timing at which the response waiting time has elapsed as the timing at which the response waiting time ends (end timing determination processing). The CPU 111 ends the response waiting state at the end timing. In step S311, the CPU 111 ends the processing in the association period S101, and shifts the processing to the power transmission preparation period S102. More specifically, the CPU 111 issues an instruction to start to transmit power after a lapse of the end timing, and the wireless transmission unit 120 starts to transmit power.

If the response number is the second number threshold value (y1=3) or smaller (NO in step S307), the processing proceeds to step S308, and the CPU 111 continues the processing in the association period S101. In step S308, the CPU 111 determines whether the response waiting time is extended. If the response waiting time has already been extended (YES in step S308), the CPU 111 determines that the response waiting time is not extended, and the processing proceeds to step S310. If the response waiting time has not been extended (NO in step S308), the CPU 111 determines that the response waiting time is extended, and processing proceeds to step S309.

In step S309, the CPU 111 extends the response waiting time from the power receiving apparatus 20 by a second time (t2), and the processing proceeds to step S303. The second time (t2) is a previously set time, and is stored in the ROM 112 or the like. When the process in step S309 is performed, the response waiting time, which has been referred to in step S306, becomes a total value (t1+t2) of the response waiting time (t1), which has been set in step S302, and the second time (t2), by which the response waiting time has been extended in step S309, in the subsequent processes. The total value (t1+t2) is an example of the second time. The process in step S309 is an example of the end timing determination processing.

If the response waiting time is thus extended, the CPU 111 sets the total value (t1+t2) as the response waiting time, and determines a timing at which the response waiting time ends based on a response number counted within the response waiting time in the subsequent processes S303 to S307.

In step S310, the CPU 111 confirms whether the power receiving apparatus 20, which has transmitted the power receiving request, i.e., the power receiving apparatus 20, which desires to receive power, exists. Specifically, the CPU 111 reads out the power receiving apparatus information stored in the RAM 113, and confirms the presence or absence of the power receiving apparatus 20 that has transmitted the power receiving request.

If the power receiving apparatus 20, which desires to receive power, exists (YES in step S310), the processing proceeds to step S311. If the power receiving apparatus 20, which desires to receive power, does not exist (NO in step S310), no power transmission target exists, and the processing ends.

In step S311, the CPU 111 selects, out of the power receiving apparatuses 20 that have transmitted the power receiving requests, the power receiving apparatus 20 as a power transmission target. The CPU 111 transmits an assignment result indicating that power transmission is assigned to the selected power receiving apparatus 20. In step S312, the CPU 111 then prepares to transmit power. Specifically, the CPU 111 sets various types of parameters, which are essential for power transmission between the power receiving apparatus 20 as the power transmission target and itself. The various types of parameters, which are essential for power transmission, include a frequency band, an antenna, and a resonance frequency.

In step S313, the CPU 111 then transmits power to the power receiving apparatus 20 as the power transmission target from the wireless transmission unit 120 (power transmission processing). In step S314, the CPU 111 then ends the power transmission when the power transmission apparatus 10 receives a power transmission end notification from the power receiving apparatus 20. The CPU 111 ends the power transmission even if a time set in the power transmission preparation period S102 has elapsed, if communication is disconnected for a predetermined time or longer, and if a failure in power transmission has occurred in the power transmission apparatus 10.

As described above, the CPU 111 can determine the timing at which the response waiting time ends based on the response number obtained from the power necessity information received within the first time set as the response waiting time. Thus, the power transmission apparatus 10 can shorten a time required until the power transmission is completed.

Figure 8:
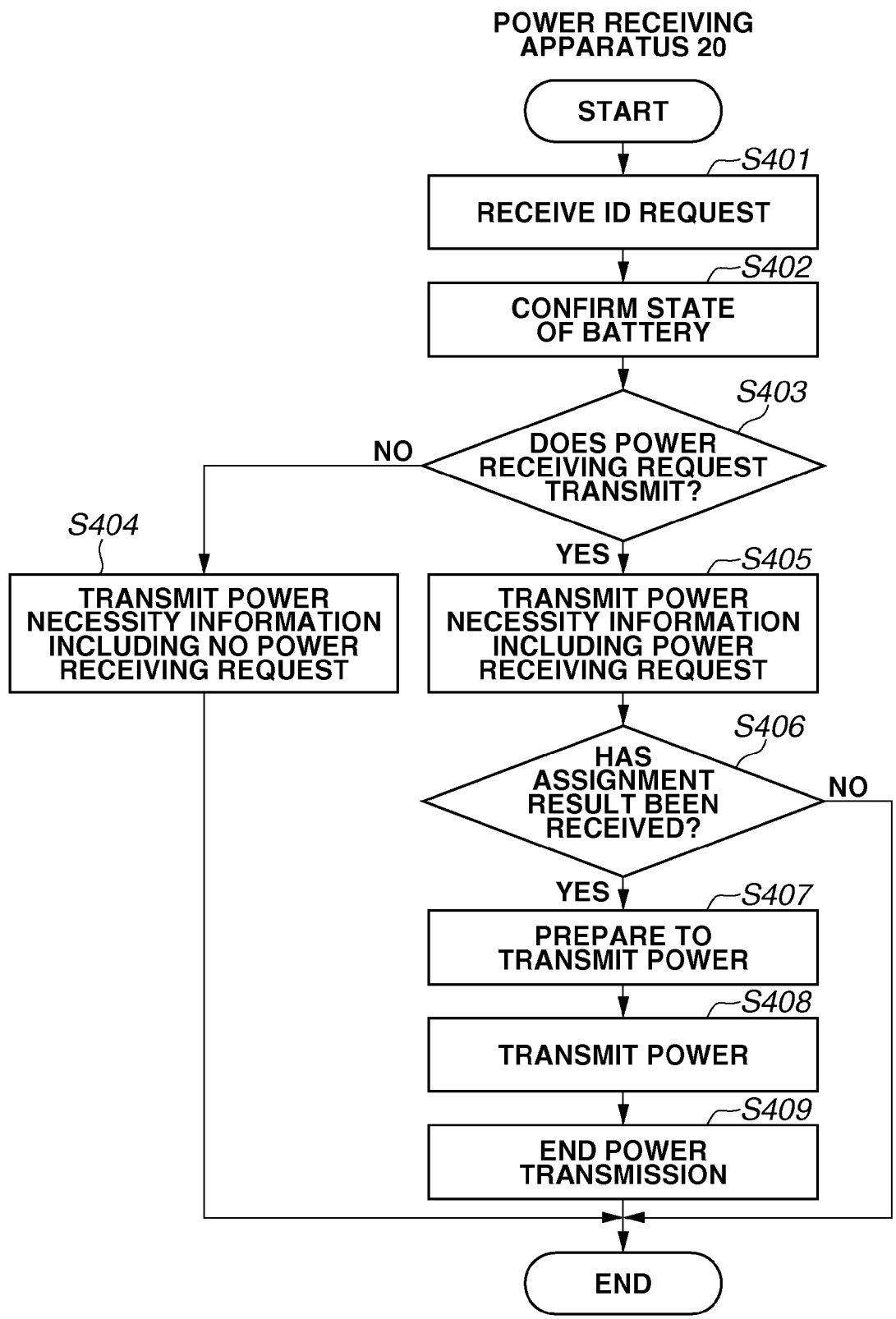
FIG. 8 is a flowchart illustrating power receiving processing.

FIG. 8 is a flowchart illustrating power receiving processing of the power receiving apparatus 20. Processes in steps S401 to S405 illustrated in FIG. 8 correspond to the processes in steps S201 to S205 in the processing in the superframe (FIG. 6). Processes in steps S406 to S409 illustrated in FIG. 8 correspond to the processes in steps S206 to S207 in the processing in the superframe.

In step S401, the CPU 211 in the power receiving apparatus 20 receives a device ID request from the power transmission apparatus 10 in the wireless receiving unit 230. The CPU 211 uses the device ID 3210 in the frame format, to notify the power transmission apparatus 10 of the device ID 3210 from the wireless transmission unit 220.

In step S402, the CPU 211 then confirms a state of the battery 237, i.e., the remaining amount of the battery 237. In step S403, the CPU 211 then determines whether a power receiving request is transmitted based on the state of the battery 237. Specifically, the CPU 211 determines whether a power receiving determination condition is satisfied based on the state of the battery 237. If the power receiving determination condition is satisfied (YES in step S403), the CPU 211 determines that the power receiving request is transmitted.

The determination condition is any one of the condition that a particular function is operating, the condition that there is no remaining charge amount of the battery 237, the condition that the residual charge of the battery 237 is 50% or smaller of the total charge capacity, or their combination, for example. The determination condition may be changeable, as needed, by the user using the UI 215.

The determination processing is not limited to the foregoing. As another example, the determination condition may be based on a temperature of the battery 237, a distance between the power transmission apparatus 10 and the power receiving apparatus 20, and a positional relationship between the power transmission apparatus 10 and the power receiving apparatus 20.

If the CPU 211 determines that the power receiving request is transmitted (YES in step S403), the processing proceeds to step S405. If the CPU 211 determines that the power receiving request is not transmitted (NO in step S403), the processing proceeds to step S404. In step S404, the CPU 211 embeds information indicating that the power receiving request is not issued in the power management 3120, to generate a response frame as power necessity information. The CPU 211 transmits the generated power necessity information to the power transmission apparatus 10. The power necessity information further includes an operation function in the payload 321 (FIG. 5), and information representing the state of the battery 237 is included in the power management 3120. In step S404, the CPU 111 ends the power receiving processing after the process in step S404 because the power receiving request is not issued.

In step S405, the CPU 211 embeds the power receiving request in the power management 3120, to generate a response frame as power necessity information. The CPU 211 transmits the generated power necessity information to the power transmission apparatus 10. A configuration, other than the power receiving request, of the power necessity information, which has been generated in step S405, is similar to a configuration of the power necessity information that has been generated in step S404.

After the CPU 211 has transmitted the response frame including the power receiving request in step S405, the processing proceeds to step S406. In step S406, the CPU 211 waits for receiving of an assignment result, and determines whether the assignment result has been received. The assignment result is information indicating that the power receiving apparatus 20 has been assigned to a power supply channel, i.e., has been selected as a power transmission target. If the assignment result has been received (YES in step S406), the processing proceeds to step S407. If the assignment result has not been received (NO in step S406), the CPU 211 ends the power receiving processing.

In step S407, the CPU 211 prepares to transmit power. Specifically, the CPU 211 sets various types of parameters relating to power transmission between the power transmission apparatus 10 and itself. The various types of parameters, which are essential for power transmission, include a frequency band, an antenna, and a resonance frequency. In step S408, the CPU 211 then receives power transmitted from the power transmission apparatus 10, and charges the battery 237. In step S409, the CPU 211 then transmits a power transmission end notification to the power transmission apparatus 10 when it has charged the battery 237, and ends the power transmission. The CPU 211 ends the power transmission if a time set in the power transmission preparation period S102 has elapsed, if communication is disconnected for a predetermined time or longer, or if a failure in power transmission has occurred in the power transmission apparatus 10 in addition to completion of the charging of the battery 237.

Figure 9:
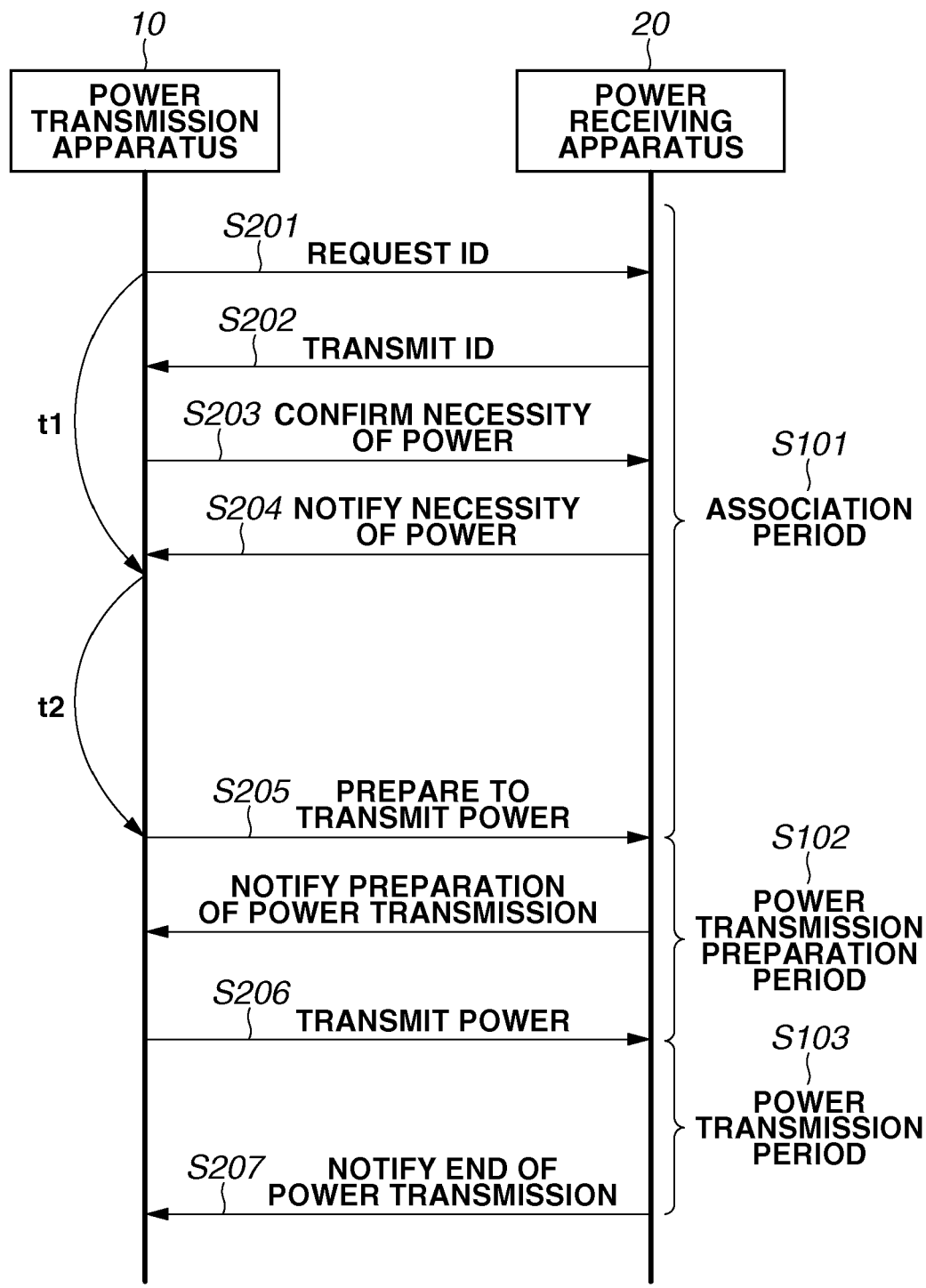
FIG. 9 specifically illustrates power transmission processing.

The power transmission processing illustrated in FIG. 7 will be specifically described below with reference to FIGS. 9 to 11. FIG. 9 illustrates data transmission and receiving processing performed when a power transmission apparatus 10 receives a power receiving request as response information from one power receiving apparatus 20 within a response waiting time (t1). As illustrated in FIG. 9, in step S201, the CPU 111 in the power transmission apparatus 10 sets the response waiting time (t1) after transmitting an ID request, to start to measure an elapsed time. The CPU 111 waits for receiving of the power receiving request.

In an example illustrated in FIG. 9, the response information is received from the one power receiving apparatus 20 within the response waiting time (t1). Therefore, the response number (one) is a second number threshold value y1 (i.e., 3) or smaller. Thus, the CPU 111 extends the response waiting time (t1) to "t1+t2" by the processes in steps S306 to S309.

Further, in the example illustrated in FIG. 9, the CPU 111 does not newly receive a receiving request within the response waiting time after the extension (t1+t2). Thus, the CPU 111 determines a timing at which the response waiting time after the extension (t1+t2) elapses as a timing at which the response waiting time ends in the processes in steps S307 to S310, and shifts the processing to the power transmission preparation period S102.

If the response number is thus the second number threshold value y1 or smaller (the response number is one to three in the present exemplary embodiment), the timing at which the response waiting time ends becomes the timing at which the response waiting time after the extension (t1+t2) elapses.

Figure 10:
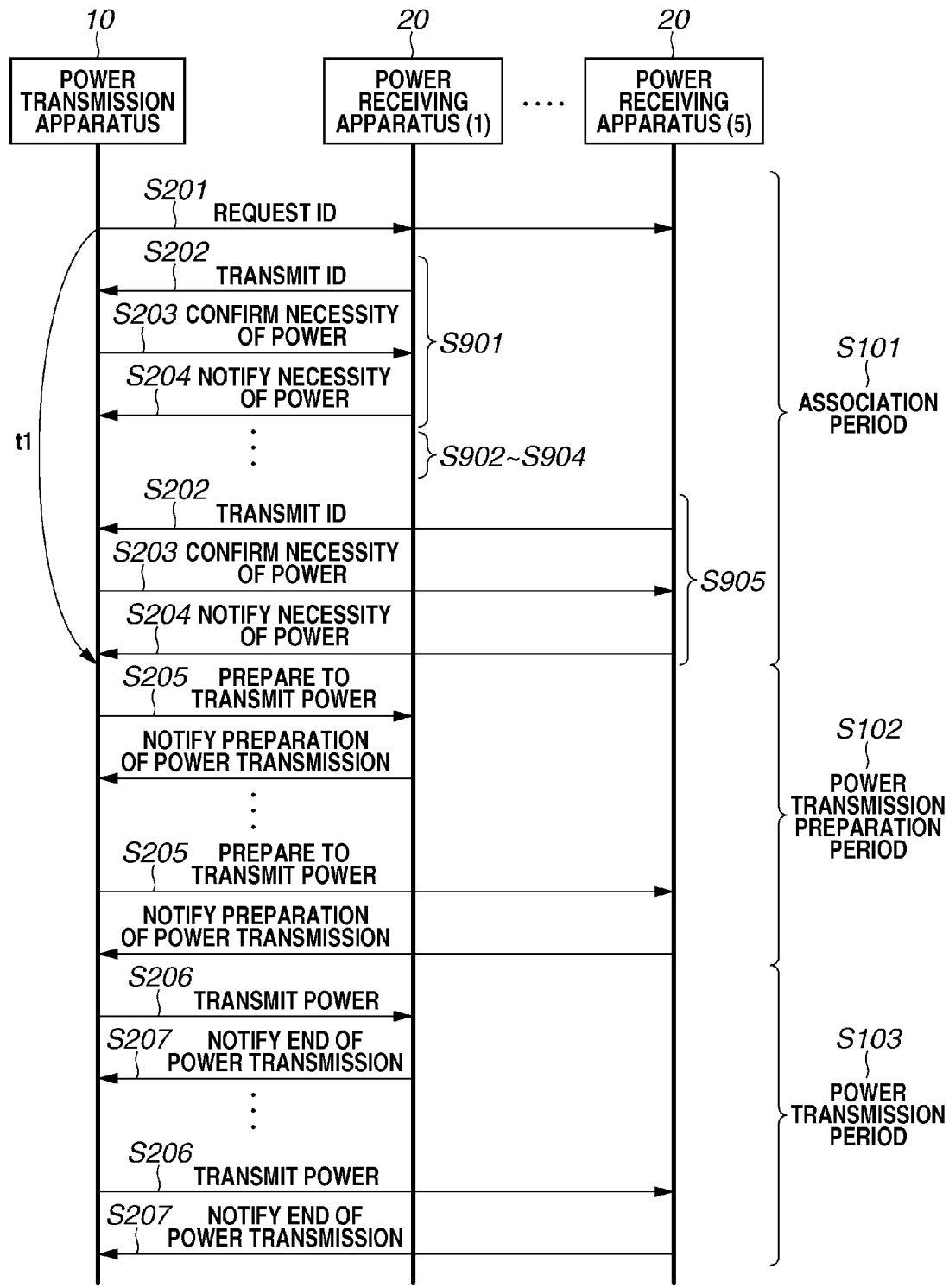
FIG. 10 specifically illustrates power transmission processing.

FIG. 10 illustrates processes in data transmission and receiving processing performed when the power transmission apparatus 10 has received response information from each of five power receiving apparatuses 20 within the response waiting time (t1). In FIG. 10, processes in steps S901 to S905 correspond to the processes in steps S201 to S204 between the power transmission apparatus 10 and power receiving apparatuses (1) to (5).

In an example illustrated in FIG. 10, the processes in steps S901 to S905 are completed within the response waiting time (t1), and the CPU 111 receives a power receiving request as response information from each of the power receiving apparatuses (1) to (5). More specifically, the response number (i.e., 5) is the first number threshold value x1 (i.e., 7) or smaller. Therefore, the CPU 111 determines a timing at which the response waiting time (t1) elapses as an end timing in step S306, and shifts the processing to the power transmission preparation period S102 without extending the response waiting time (t1).

If the response number is thus the first number threshold value x1 or smaller and is larger than the second number threshold value y1 (if the response number is four to seven in the present exemplary embodiment), the timing at which the response waiting time (t1) ends becomes the timing at which the response waiting time (t1) elapses.

Figure 11:
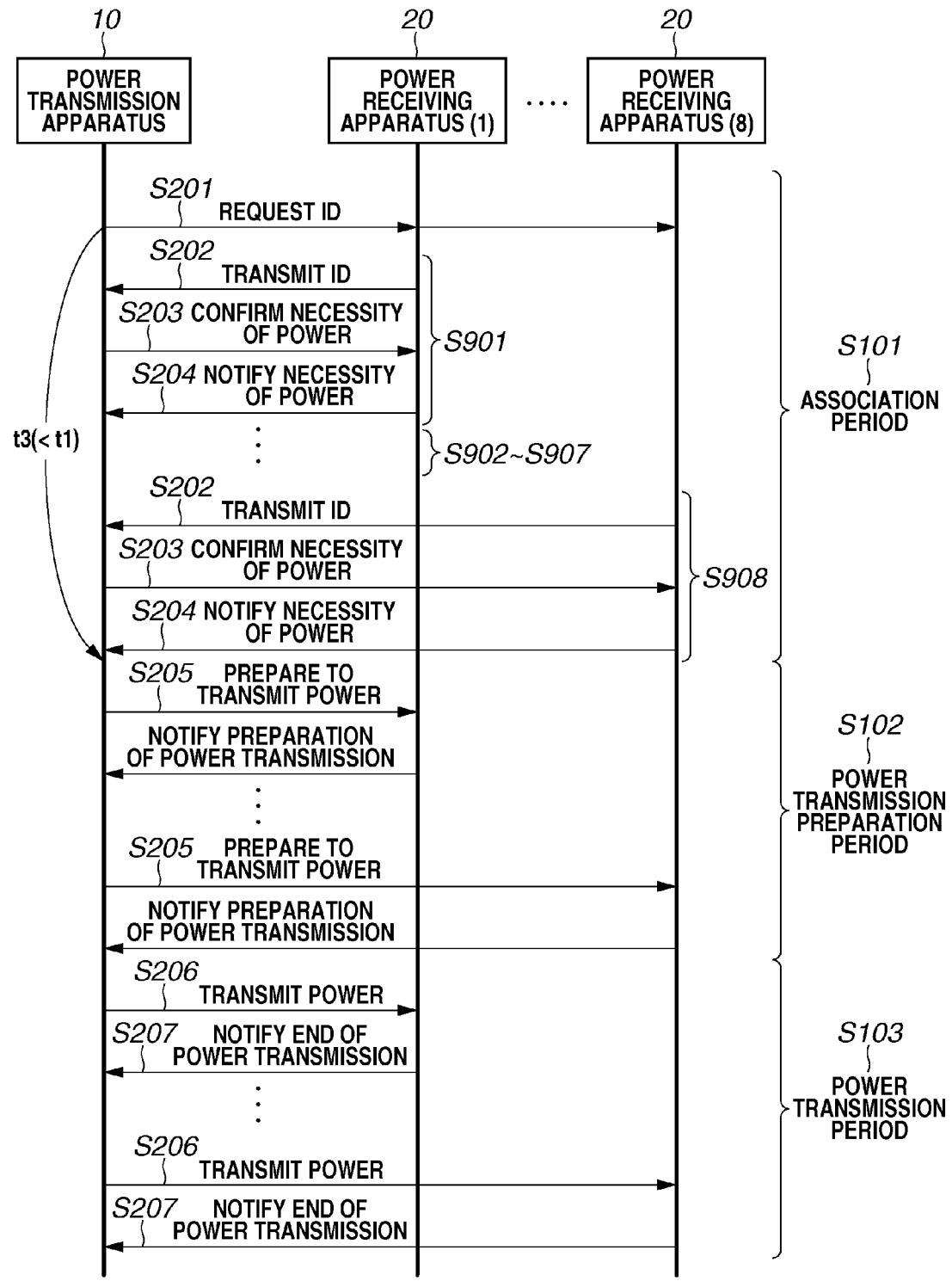
FIG. 11 specifically illustrates power transmission processing.

FIG. 11 illustrates processes in data transmission and receiving processing performed when a power transmission apparatus 10 has received response information from each of eight power receiving apparatuses 20 within the response waiting time (t1). In an example illustrated in FIG. 11, the CPU 111 receives the response information from each of power receiving apparatuses (1) to (8) before the response waiting time (t1) elapses. More specifically, a larger response number than a first number threshold value x1 (seven) is obtained. Therefore, the CPU 111 determines a timing at which the response number exceeds the first number threshold value x1 as an end timing in the process in step S305. The CPU 111 ends a response waiting state without waiting until the response waiting time (t1) elapses, and shifts the processing to the power transmission preparation period S102.

If the response number is thus larger than the first number threshold value x1 (if the response number is eight or larger in the present exemplary embodiment), the timing at which the response waiting time (t1) ends is the timing at which the response number exceeds the first number threshold value x1.

FIG. 12 illustrates a relationship between a response number and a response waiting time. If the response number is zero to three, the response waiting time becomes "t1+t2". If the response number is four to seven, the response waiting time becomes "t1". If the response number is eight or larger, the response waiting time becomes "t3" (<t1).

Thus, the power transmission apparatus 10 according to the first exemplary embodiment determines the first number threshold value x1 and the second number threshold value y1 based on the response number that is assumed as the power transmission target in the superframe. The power transmission apparatus 10 determines the timing at which the response waiting time ends in response to the response number. Thus, the power transmission apparatus 10 can optimize the length of the association period S101 and shorten a time required until the power transmission is completed.

A wireless power supply system according to a second exemplary embodiment will be described below. A power transmission apparatus 10 according to the second exemplary embodiment determines a timing at which a response waiting time ends based on an amount of power required by each of power receiving apparatuses 20 as transmission sources of power receiving requests instead of the response number. The required amount of power is an amount of power required by each of the power receiving apparatuses 20. The required amount of power is determined based on a state of a battery 237 by a CPU 211, for example.

FIG. 13 is a flowchart illustrating power transmission processing in the second exemplary embodiment. Processes different from those in the power transmission processing in the first exemplary embodiment will be described below. In step S324, a CPU 111 in the power transmission apparatus 10 requests a response inquiring whether power is required of the power receiving apparatus 20 as a transmission source of a response to an ID request while transmitting a power necessity information request for requesting a required amount of power as a response.

In response to this operation, the power receiving apparatus 20 transmits power necessity information including the required amount of power in addition to the power receiving request in step S405 in FIG. 8. The CPU 111 receives the power necessity information (a response frame) including the required amount of power. The CPU 111 stores the received power necessity information as power receiving apparatus information in a RAM 113 in association with a device ID 3210.

In step S325, the CPU 111 then calculates a total value of required amounts of power included in the power necessity information. Specifically, the CPU 111 reads out the power receiving apparatus information stored in the RAM 113, refers to the read power receiving apparatus information, accumulates respective amounts of power required by the power receiving apparatuses 20 that have transmitted the power receiving requests, and obtains a total value of amounts of transmission power to be transmitted by the power transmission apparatus 10 (calculation processing).

The CPU 111 compares the total value with a first power threshold value x2. The first power threshold value x2 is a previously set value, and is stored in a ROM 112 or the like. In the present exemplary embodiment, the first power threshold value x2 is set to 1000 mW/min.

In step S325, the CPU 111 determines whether the total value is larger than the first power threshold value (x2=1000 mW/min). If the total value is larger than the first power threshold value x2 (YES in step S325), the CPU 111 determines a timing at which the total value exceeds 1000 mW/min as an end timing (end timing determination processing). If the total value is the first power threshold value x2 or smaller (NO in step S325), the processing proceeds to step S306.

In step S306, the CPU 111 determines whether a response waiting time has elapsed. If the response waiting time has elapsed (YES in step S306), then in step S327, the CPU 111 calculates the total value, like in the process in step S325. The CPU 111 compares the total value with a second power threshold value y2, and determines whether the total value is larger than the second power threshold value y2. The second power threshold value y2 is a value less than the first power threshold value x2, and is a previously set value. The second power threshold value y2 is stored in the ROM 112 or the like. In the present exemplary embodiment, the second power threshold value y2 is set to 500 mW/min.

If the total value is larger than the second power threshold value (y2=500 mW/min) (YES in step S327), the processing proceeds to step S311. More specifically, in step S327, the CPU 111 determines a timing at which the total value exceeds 500 mW/min as a timing at which the response waiting time ends (end timing determination processing). The CPU 111 ends a response waiting state at the end timing. If the total value is the second power threshold value y2 or smaller (NO in step S327), the processing proceeds to step S308, and the CPU 111 continues processing in an association period S101.

As described above, the CPU 111 can determine the timing at which the response waiting time ends based on the required amount of power included in the power necessity information received within a first time t1. Thus, the power transmission apparatus 10 can shorten a time required until power transmission is completed.

FIG. 14 illustrates a relationship between an amount of power required by the power receiving apparatus 20 as a transmission source of a power receiving request and a response waiting time. It is assumed that the power transmission apparatus 10 has received power necessity information including a power receiving request from each of seven power receiving apparatuses 20. As illustrated in FIG. 14, an amount of power required by a power receiving apparatus (1) is 100 mW/min. Amounts of power required by power receiving apparatuses (2) to (7) are respectively 200 mW/min, 100 mW/min, 200 mW/min, 100 mW/min, 200 mW/min, and 300 mW/min.

A determination criterion of the response waiting time in the power transmission processing (FIG. 13) includes three cases, i.e., a case where the required amount of power is a second power threshold value (500 mW/min) or smaller, a case where the required amount of power is larger than the second power threshold value (500 mW/min) and a first power threshold value (1000 mW/min) or smaller, and a case where the required amount of power is larger than the first power threshold value (1000 mW/min).

If the total value is the second power threshold value (500 mW/min) or smaller, the response waiting time is extended, and a total response waiting time becomes "t1+t2". If the total value is larger than the second power threshold value (500 mW/min) and is the first power threshold value (1000 mW/min) or smaller, the response waiting time becomes "t1". If the total value is larger than the first power threshold value (1000 mW/min), the response waiting time ends at a timing at which the total value exceeds the first power threshold value (1000 mW/min). More specifically, in this case, the response waiting time is "t1" or smaller.

It is assumed that the power transmission apparatus 10 has received the power necessity information including the power receiving requests from the power receiving apparatuses (1) to (3) requiring amounts of power illustrated in FIG. 14 in this order within the response waiting time (t1). In this case, a total value (400 mW/min) at the time point where the power necessity information has been received from the power receiving apparatus (3) is the second power threshold value (500 mW/min) or smaller.

Thus, the CPU 111 extends the response waiting time (t1) by "t2" in step S308 (FIG. 13) after the power necessity information has been received from the power receiving apparatus (3). Thus, the response waiting time becomes "t1+t2".

It is assumed that the power transmission apparatus 10 has received the power necessity information from the power receiving apparatuses (1) to (6) in this order within the response waiting time (t1). In this case, a total value at the time point where the power necessity information has been received from the power receiving apparatus (4) is 600 mW/min, and a total value at the time point where the power necessity information has been received from the power receiving apparatus (6) is 900 mW/min. More specifically, a total value from the time point where the power necessity information has been received from the power receiving apparatus (4) to the time point where the power necessity information has been received from the power receiving apparatus (6) is larger than the second threshold value (500 mW/min) and the first power threshold value (1000 mW/min) or smaller.

Therefore, the CPU 111 determines a timing at which the response waiting time (t1) has elapsed as a timing at which the response waiting time (t1) ends without extending the response waiting time (t1).

It is assumed that the power transmission apparatus 10 has received the power necessity information from the power receiving apparatuses (1) to (7) in this order within the response waiting time (t1). In this case, a total value (1200 mW/min) at the time point where the power necessity information has been received from the power receiving apparatus (7) is larger than the first power threshold value (1000 mW/min).

Therefore, the CPU 111 receives the power receiving necessity information from the power receiving apparatus (7), and ends the response waiting time (t1) before the response waiting time (t1) elapses in step S325 (FIG. 13).

Thus, the power transmission apparatus 10 according to the second exemplary embodiment determines the response waiting time using the amount of transmission power per unit time, which is assumed to be transmitted in a superframe, as a determination criterion. Thus, the length of the association period S101 can be optimized, and the time required until power transmission is completed can be shortened. Therefore, the power transmission apparatus 10 according to the second exemplary embodiment can determine the timing at which the response waiting time ends based on a receiving situation of the required amount of power included in the response information received from the power receiving apparatus 20.

OTHER EMBODIMENTS

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-058361 filed Mar. 21, 2013, which is hereby incorporated by reference herein in its entirety.

What is claimed is:

1. An apparatus comprising:
a transmission unit configured to transmit inquiry information for inquiring presence or absence of a power receiving request to a plurality of power receiving apparatuses;
a receiving unit configured to receive response information to the inquiry information from each of the power receiving apparatuses;
a determination unit configured to determine an end timing at which a response waiting time during which the receiving unit waits for the receiving of the response information based on a receiving situation of the response information within a first time from a transmission timing at which the inquiry information has been transmitted; and
a transmission unit configured to transmit power after a lapse of the end timing.

2. The apparatus according to claim 1, further comprising a counting unit configured to count a number of power receiving apparatuses as transmission sources of the response information,
wherein the determination unit determines the end timing based on the number counted before a lapse of the first time.

3. The apparatus according to claim 2, wherein the determination unit determines, when the number counted before the lapse of the first time is larger than a first number threshold value, the end timing based on a timing at which the number exceeds the first number threshold value.

4. The apparatus according to claim 3, wherein the determination unit determines the end timing based on a timing at which the first time has elapsed when the number counted at the timing at which the first time has elapsed is the first number threshold value or smaller and is larger than a second number threshold value less than the first number threshold value.

5. The apparatus according to claim 4, wherein the determination unit determines the end timing based on the number counted before a lapse of a second time that is longer than the first time when the number counted at the timing at which the first time has elapsed is the second number threshold value or smaller.

6. The apparatus according to claim 1, wherein
the receiving unit receives the response information including an amount of power required by each of the power receiving apparatuses, and
the determination unit determines the end timing based on the required amount of power.

7. The apparatus according to claim 6, further comprising a calculation unit configured to calculate, when the receiving unit receives a plurality of pieces of response information, a total value of required amounts of power respectively included in the response information,
wherein the determination unit determines the end timing based on the total value calculated before the lapse of the first time.

8. The apparatus according to claim 7, wherein the determination unit determines, when the total value calculated before the lapse of the first time is larger than the first power threshold value, the end timing based on a timing at which the total value exceeds the first power threshold value.

9. The apparatus according to claim 8, wherein the determination unit determines the end timing based on a timing at which the first time has elapsed when the total value calculated at the timing at which the first time has elapsed is the first power threshold value or smaller and is larger than a second power threshold value less than the first power threshold value.

10. The apparatus according to claim 9, wherein the determination unit determines the end timing based on the total value calculated before a lapse of a second time that is longer than the first time when the total value calculated at the timing at which the first time has elapsed is the second power threshold value or smaller.

11. A method performed by an apparatus, the method comprising:
transmitting inquiry information for inquiring presence or absence of a power receiving request to a plurality of power receiving apparatuses;
receiving response information to the inquiry information from each of the power receiving apparatuses;
determining an end timing at which a response waiting time during which the receiving of the response information is waited for based on a receiving situation of the response information within a first time from a transmission timing at which the inquiry information has been transmitted; and
starting to transmit power after a lapse of the end timing.

12. The method according to claim 11, further comprising counting a number of power receiving apparatuses as transmission sources of the response information, wherein the determining determines the end timing based on the number counted before a lapse of the first time.

13. The method according to claim 12, wherein the determining determines, when the number counted before the lapse of the first time is larger than a first number threshold value, the end timing based on a timing at which the number exceeds the first number threshold value.

14. The method according to claim 13, wherein the determining determines the end timing based on a timing at which the first time has elapsed when the number counted at the timing at which the first time has elapsed is the first number threshold value or smaller and is larger than a second number threshold value less than the first number threshold value.

15. The method according to claim 11, wherein
the receiving receives the response information including an amount of power required by each of the power receiving apparatuses, and
the determining determines the end timing based on the required amount of power.

16. A computer-readable storage medium storing a program for causing a computer to function as:
a transmission unit configured to transmit inquiry information for inquiring presence or absence of a power receiving request to a plurality of power receiving apparatuses;
a receiving unit configured to receive response information about a response to the inquiry information from each of the power receiving apparatuses;
a determination unit configured to determine an end timing at which a response waiting time during which the receiving unit waits for the receiving of the response information based on a receiving situation of the response information within a first time from a transmission timing at which the inquiry information has been transmitted; and
a transmission unit configured to start to transmit power after a lapse of the end timing.

17. The computer-readable storage medium according to claim 16, further comprising a counting unit configured to count a number of power receiving apparatuses as transmission sources of the response information,
wherein the determination unit determines the end timing based on the number counted before a lapse of the first time.

18. The computer-readable storage medium according to claim 17, wherein the determination unit determines, when the number counted before the lapse of the first time is larger than a first number threshold value, the end timing based on a timing at which the number exceeds the first number threshold value.

19. The computer-readable storage medium according to claim 18, wherein the determination unit determines the end timing based on a timing at which the first time has elapsed when the number counted at the timing at which the first time has elapsed is the first number threshold value or smaller and is larger than a second number threshold value less than the first number threshold value.

20. The computer-readable storage medium according to claim 16, wherein
the receiving unit receives the response information including an amount of power required by each of the power receiving apparatuses, and
the determination unit determines the end timing based on the required amount of power.

* * * * *